Sept. 5, 1933.  V. G. APPLE  1,925,891

ARMATURE

Filed March 13, 1930

INVENTOR
Vincent G. Apple

Patented Sept. 5, 1933

1,925,891

UNITED STATES PATENT OFFICE 1,925,891

ARMATURE

Vincent G. Apple, Dayton, Ohio; Herbert F. Apple, Edward M. Apple, and Gourley Darroch, executors of said Vincent G. Apple, deceased Application March 13, 1930. Serial No. 435,485

4 Claims. (Cl. 171—206)

This invention relates to armatures for dynamo electric machines and particularly to that class having the windings encased in a jacket of molded insulation.

An object of the invention is to generally improve an armature of this type.

More particularly an object is to permanently secure the several parts of the armature in their required spaced apart relation, both electrically and mechanically, by means of a single mass of cementitious insulation molded through, between and about them, said insulation at the same time forming an impervious coating over the windings.

Another object is to decrease the over-all length of an armature of a given capacity.

Another object is to improve the magnetic circuit through an armature of a given size.

Another object is to provide increased protection against physical injury.

I attain these objects by the structure described in the following specification, reference being had to the accompanying drawing, wherein—

Similar numerals refer to similar parts throughout the several views.

Figure 1:
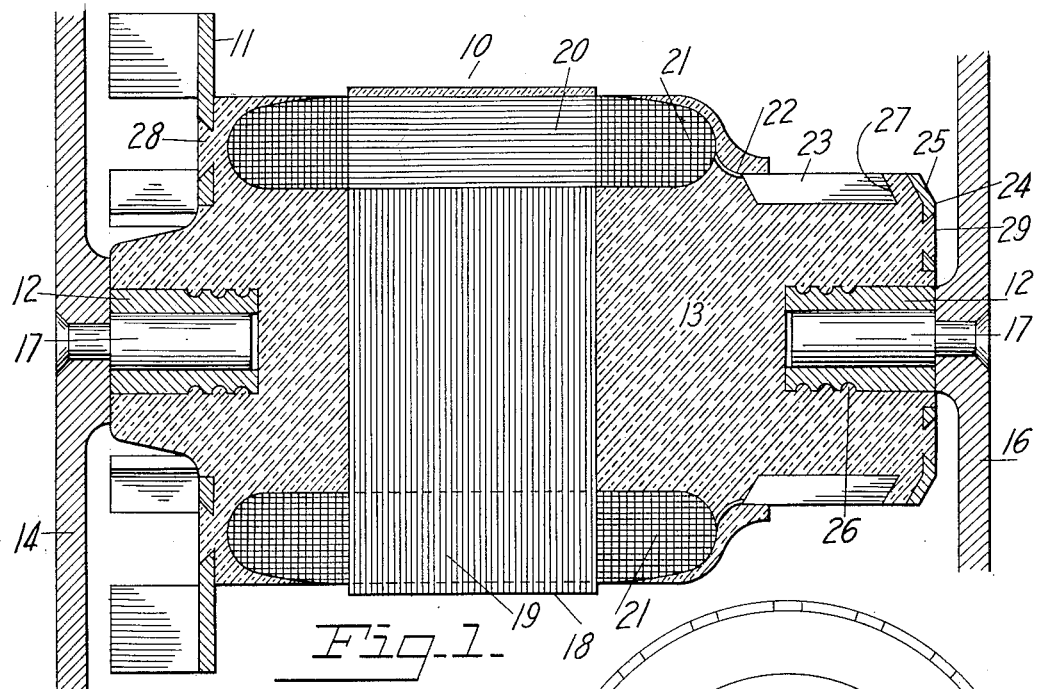
Fig. 1 is an axial section through an armature embodying the principles of my invention, fragments of the end walls of a motor frame being included for illustrative purposes.
Figure 3:
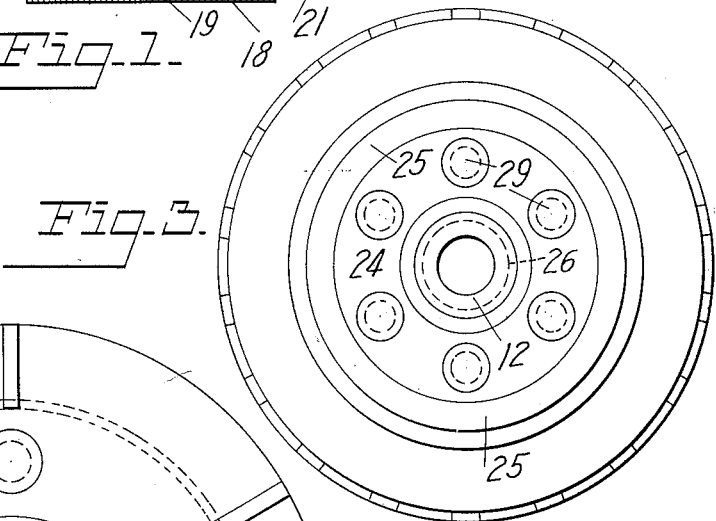
Fig. 3 is a right hand end view of the armature.
Figure 2:
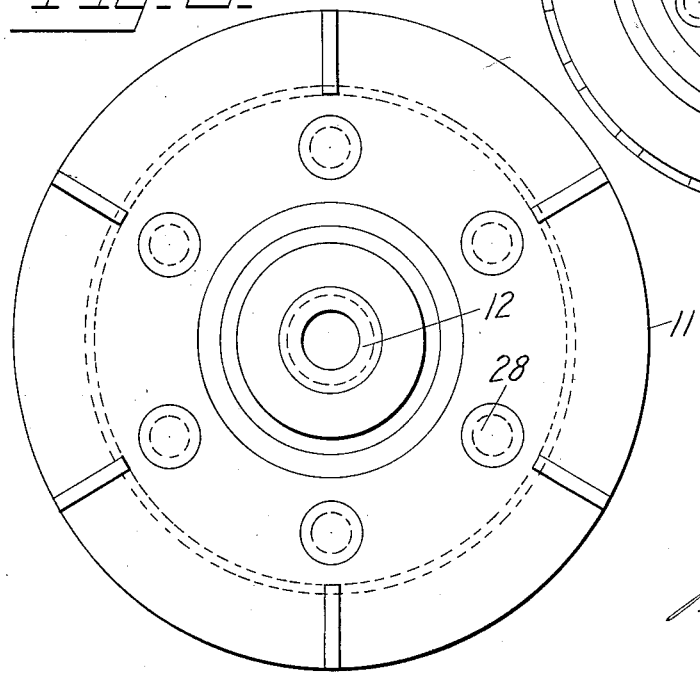
Fig. 2 is a left hand end view of the armature.

The armature 10, selected to illustrate my invention, is adapted to furnish power for a motor driven blower and a sheet metal blower impeller 11 is accordingly made a part thereof, and, in order to consume as little end room as possible the bearing bushings 12 upon which the armature may rotate are imbedded in the insulation mass 13 and thus made a part of the armature, and rotate therewith instead of being held against rotation in and by the motor frame as in common practice. In this way no armature shaft is required, and inasmuch as the length of the bearing bushings are within the length of the armature, instead of being added thereto, the over-all length of a motor embodying my armature is reduced, the end walls 14 and 16 of the motor frame carrying the short inwardly extending stationary studs 17 about which the armature may rotate.

There being no shaft, the laminated core 18 has no central axial opening therethrough, thereby providing an improved flux path through the magnetic element. The laminæ 19 are temporarily secured together with an insulating cement which is cured sufficiently to make the laminæ adhere one to the other before the coils 21 are wound about them.

After the coils 21 have been wound into the slots 20, leaving short wire leads 22 extending at appropriate intervals from the coils, individual commutator segments 23 are electrically connected, one to each lead. The assembled core 18, coils 21 and segments 23 are put in a mold not shown, together with the impeller 11, the bearing bushings 12 and a commutator end protecting plate 24, and the mass 13 of insulation is forced into the mold at one end of the core through the unfilled portions of the slots 20 to the other end of the core and solidified, the mass 13 being thus somewhat divided into two main parts by the core 18, joined however by integral struts of the insulating material which extend through the unfilled part of the slots 20, which, after the mass is solidified and the mold removed, permanently secure the laminæ 19 of core 20 together. The commutator end protecting plate 24 is turned over toward the segments at the outer edge as at 25 to assist the insulation mass in resisting bursting strains due to centrifugal force at high rotative speeds.

In order to enable the insulation mass 13 to get a better hold on the several parts to bind them together, the bearing bushings 12 may be grooved around their outer diameters as at 26, the commutator segments 23 may be beveled at their outer ends 27 and the impeller 11 and plate 24 may have outwardly tapering holes through the metal as at 28 and 29 through, into and about which the mass of insulation may extend to hold the parts in spaced relation, the mold having means to hold the several parts in the relation shown until the insulation is placed.

The armature shown has many advantages. That portion of the insulation surrounding the coil ends renders them non-hygroscopic and protects them against physical injury; that portion which extends through the slots covers the coils and joins the main portions of the insulation one to the other, thus holding the core laminæ together, eliminating the shaft and central shaft opening, thereby improving the magnetic circuit; that portion which extends outwardly between the commutator segments and around their beveled ends to hold them electrically spaced apart and against radially outward movement, extends also inwardly around a bearing bushing to keep it supported in concentric relation with the core and commutator; while the impeller and the commutator end protecting plate are held to the ends, not by screws, rivets, or separately provided fastening means, but by integral parts of the same mass of insulation already provided for other purposes.

While in the embodiment shown all of the foregoing advantages are embraced, some of the features enumerated may, with advantage, be employed independently of the others, and while the means shown for transmitting the power of the motor is, in the instant case, an impeller, other means such as a pulley or pinion may be used, and secured to the armature in a similar manner.

Having described an embodiment of my invention, I claim—

1. In an armature, a bearing bushing for rotative support of said armature, a winding, and a single mass of insulation extending inwardly about said bearing bushing and outwardly into and about said winding to join the two in spaced relation, said bearing bushing being supported solely in and by said insulation.

2. In an armature, a core having winding apertures, a winding in said apertures extending axially beyond the core at both ends, a bearing bushing at each end of the core in axial alignment therewith and a continuous mass of hardened insulation surrounding the winding and bearing bushing at one end of the core extending through the said apertures and surrounding the winding and bearing bushing at the other end of the core.

3. In an armature, a core, a winding, individual commutator segments attached to leads extending from said winding, a bearing bushing for rotative support of said armature, and a single mass of insulation penetrating and covering said winding, extending between the commutator segments and completely surrounding said bearing bushing, neither said segments nor said bearing bushing having any other means of support than said insulation.

4. In an armature, a winding, a power transmitting member spaced apart from said winding, and a hub of hardened cementitious insulation extending into the interstices of said winding and into openings in said power transmitting member to maintain rotative driving relation between them.

VINCENT G. APPLE.